Patented Jan. 27, 1931

1,790,519

UNITED STATES PATENT OFFICE

HAROLD S. DAVIS, OF BELMONT, MASSACHUSETTS, ASSIGNOR, BY MESNE ASSIGNMENTS, TO PETROLEUM CHEMICAL CORPORATION, OF NEW YORK, N. Y., A CORPORATION OF DELAWARE

RECOVERY OF UNSATURATED HYDROCARBONS AND THEIR DERIVATIVES FROM MIXTURES CONTAINING THE SAME

No Drawing. Application filed October 28, 1925, Serial No. 65,497. Renewed June 13, 1930.

This invention provides an improved process for the treatment of mixtures of hydrocarbon compounds in order to separate and recover derivatives of certain more reactive and more highly unsaturated components of the mixture and to prepare for utilization and to utilize a part or all of the remaining hydrocarbons, for example, by their conversion into useful compounds.

Processes within this invention are particularly suitable to treatment of hydrocarbon mixtures obtained by the thermal decomposition or cracking of mineral hydrocarbons, such as petroleum, oil-shale, and the like, and may advantageously be applied to any mixture of unsaturated hydrocarbon substances of differing reactivity to the recommended reagents. Petroleum and shale oil may be hereinafter generically designated by the term "mineral oil."

A complete effluent hydrocarbon mixture obtained, for example, by vapor-phase cracking of suitable oils may be subjected directly to treatment with advantage, but it is ordinarily desirable to separate the material worked upon into fractions having relatively higher proportional contents than the whole effluent mixture of unsaturated hydrocarbons desired to be recovered or combined. The unsaturated hydrocarbons so concentrated or accumulated as a group may be members of the olefine series, for an example of unsaturated bodies effectively converted into a desirable class of products. These products are compounds of the olefines of such base structure as to form upon combination with water tertiary alcohols; and may include the compounds of olefines of such structure as to form upon combination with water secondary alcohols. For convenience these olefines are hereinafter mentioned as "tertiary base" and "secondary base" olefines respectively.

For such concentration or accumulation, a simple fractional distillation of cracked vapors stripped of condensates of the boiling point range of commercial gasoline, and of higher boiling points, is often sufficient; the lower boiling fraction, for example, being separately collected and condensed with or without the superposition of pressure to effect absorption in this liquid fraction of absorbable normally gaseous constituents such as the butylenes.

Whatever the mode of preparation, a liquid fraction of the condensate from the vaporous efflux of relatively high temperature vapor-phase cracking, containing substantially only those constituents having boiling points of approximately 100° C. or lower, and with or without normally gaseous products in solution, is an advantageous material for treatment according to this invention. This liquid product usually contains the following types of hydrocarbon compounds:

I. Saturated hydrocarbons in small proportional volumes or negligible traces;

II. Olefines comprising hexylenes, amylenes and butylenes of (a) Secondary base structure, typically

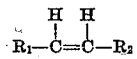

(b) Tertiary base structure, typically

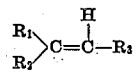

(in which expressions $R_1$, $R_2$ and $R_3$ may severally represent hydrocarbon radicals, such as $CH_3$, $CH_3 CH_2$, etc. or, in the limiting case, $R_3$ may be a hydrogen atom);

III. Propylene and ethylene in solution;

IV. Diolefines including
　　Propadiene
　　Butadienes
　　Pentadienes;

V. Acetylenes sometimes;

VI. Cyclic hydrocarbons, in small volumes.

The proportional content of hydrocarbons of the olefine series in the preferred material is relatively high.

Of the unsaturated compounds which may be ordinarily expected to appear in such mixtures, the several lower members of the olefine series and their isomers may be taken as representative. For example, any given mixture may contain:

| Group (a) Tertiary base structure | Group (b) Secondary base structure |
|---|---|
| | Propylene |
| | Butene-1 |
| Iso-butylene | Butene-2 |
| | Pentene-1 |
| | Pentene-2 |
| Unsymmetrical methyl-ethyl ethylene | Isopropyl-ethylene |
| Tri-methyl-ethylene | |

Hexylenes (ten known isomeric forms for example):

| Tetra-methyl-ethylene and other hexylenes capable of yielding tertiary alcohols. | Hexena-2 and other hexylenes capable of yielding secondary alcohols. |
|---|---|

Of this class of hydrocarbon mixtures group (a) is structurally capable of conversion into tertiary derivatives, while the remainder (b) may form secondary derivatives (such as the secondary alcohols).

The tertiary base structure olefines of group (a) and the secondary base structure olefines of group (b) react with markedly different avidity to form addition compounds with hydrogen halides, such as hydrogen chloride, under appropriate conditions. This difference is utilized by this invention to effect a separation respectively of the members of these groups from each other and from other hydrocarbons admixed therewith.

A typical characteristic of the hydrogen halide hydrocarbon compounds, important in this relation, is that they are of substantially higher boiling points than the hydrocarbons from which they are derived, or with which they may be initially admixed in the mentioned materials for treatment. The several boiling points are of such a wide range that the compounds are mutually separable one from another with relative ease and certainty by distillation. While for some uses the mixed hydrogen halide hydrocarbon compounds may be satisfactory without separation, ordinarily it is desirable to isolate the several compounds of the reaction mixture. For any such separation the diversity of boiling temperatures of said compounds is of primary importance and value.

Postulating that a purpose of the treatment is to make, separate and utilize valuable hydrocarbon derivatives, especially the secondary and tertiary base structure olefines, and/or their useful compounds, and to so effect their conversion as to realize a high yield of the desired products, the reaction with a hydrogen halide provides an advantageous treatment. In the well-known reaction of sulfuric acid upon such mixtures of olefines and diolefines to secure alkyl sulfates hydrolyzable to alcohols, for example, the more highly unsaturated hydrocarbons and the tertiary base olefines are polymerized to higher-boiling hydrocarbons, which are not such valuable products as may be obtained from the materials by a treatment conserving and utilizing the tertiary base materials. While I have elsewhere described and claimed a new sulfuric acid treatment avoiding these unnecessary losses, the present treatment not only provides a different way to avoid the losses, but also produces either the same tertiary and secondary alcohols characteristic of the sulfuric treatment and/or other valuable derivatives, including halides.

In a typical species of the present invention the light liquid fraction of the hydrocarbon products of the preferred material is first brought into intimate contact with a hydrogen halide. This substance may be carried for this contact in any appropriate menstruum (conveniently in aqueous solution) under conditions to selectively react upon the tertiary base olefines and other hydrocarbons more unsaturated than the olefines; the excess of hydrogen halide reagent solution, if any, is separated from the remainder, and the hydrogen halide compounds are segregated from the unchanged secondary base olefines, and the uncombined water, if any. Instead of water other liquids may be used as a carrying medium for the hydrogen halide; liquids of the type of acetic acid which form a homogeneous solution with the olefines are particularly effective. The secondary base olefines can now be advantageously recovered or treated in any manner desired, for example either by repetition of the hydrogen halide treatment under conditions for combination with the secondary bases, or with sulfuric acid to form acid compounds in turn hydrolyzable to the corresponding alcohols. Since the halogen addition products are uniformly of higher boiling points than either the hydrocarbons from which they are derived or the corresponding isomeric olefines of secondary base structure, the separation of the tertiary base and highly unsaturated base products can be readily and substantially completely effected by fractional distillation. Or these products may be first hydrolyzed, and the resulting hydrolyzed mixture then distilled, with some advantage, since the alcohols are also of higher boiling point than the corresponding hydrocarbons.

In a recommended application of the process to commercial practice, the material to be treated may be condensed effluent hydrocarbon vapors obtained from a cracking operation carried out upon a crude gas oil fraction, characterized by a maximum cracking temperature in the vicinity of 600° C., a prolonged maintenance of this cracking temperature in vapor-phase, and a final fractionation of the efflux vapors, as by selective condensation or redistillation of the resulting product. For example, in the instance to be described, the fraction which is distilled over from the total product of the cracking operation, up to a temperature of 100° C., may be liquefied by suitable control of pressure and temperature or either, and used as the raw material.

This liquid hydrocarbon distillate is placed in a suitable container provided with a mixer and lined with a material resistant to the hydrogen halide which is to be used. The container is preferably closed. In case the mixture is very volatile, as when it contains in solution permanent or normally gaseous constituents, the apparatus may be of suitable construction to permit the charge to be subjected to superposed pressure sufficient substantially to maintain the contents liquid. It is desirable that the container shall be jacketed in order to provide for control of the temperature of the reaction mixture by flow of a heating or cooling medium in the jacket during treatment.

A hydrogen halide, which may be associated with water, for example a concentrated aqueous solution of hydrogen chloride (sp. gr. approximately 1.20) in an amount preferably exceeding approximately one-half the volume of hydrocarbons treated, is mixed with the hydrocarbon material in the reaction vessel and the mixture thoroughly agitated. A cooling liquid, such as cold water or chilled brine, is simultaneously circulated through the jacket of the vessel. Meanwhile hydrogen chloride gas may be and preferably is introduced into the mixing chamber in such amount as to maintain the aqueous solution at substantially its initial concentration, or above, e. g., at its saturation point at the attained lower temperature; and at a rate to permit maintenance of the temperature below 20° C. and preferably in the vicinity of 4° C. These lower temperatures are desirable not because the reactions will not proceed satisfactorily at higher temperatures but largely because the reaction is apparently facilitated by the presence of water and because the solubilities of the hydrogen halides in water severally decrease with rise in temperature. On the other hand, the rate of reaction between the unsaturated compounds and a solution of a hydrogen halide of definite concentration increases as the temperature rises. Accordingly it is sometimes advantageous to carry out the process at temperatures above the specified temperature limits and/or under increased pressure. The mixing operation is continued for such time as may, under given operating conditions, prove necessary. This may be determined by observation of the refractive indices of samples of the mixture, withdrawn at periodic intervals, and the mixing operation continued until such successive readings remain constant. Reaction times varying from fifteen minutes to several hours in accordance with the temperature and the proportion of the more difficultly reactive tertiary base bodies in the mixture have been observed.

The reaction mixture thus obtained, upon separation of the surplus aqueous solution of hydrochloric acid by gravity, will be found to contain chlorides of the olefines of group (a) above referred to, which may be segregated from the unchanged hydrocarbons and are characterized by relatively higher and more diversified boiling points with respect to the original hydrocarbons from which they are derived. For example:—

| Substances | Boiling point | Source substance | Boiling point |
|---|---|---|---|
| Tertiary butyl chloride | 50–51° C. | Iso butylene | –6° C. |
| Tertiary amyl chloride: (2 chlor-2 methyl-butane) | | Tri-methyl-ethylene. | 37° C. |
| $(CH_3)(CH_3)C(CH_2CH_3)(Cl)$ | 81–88° C. | Unsymmetrical methyl-ethyl ethylene. | 31–33° C. |

Other chloride derivatives of the several hydrocarbons are also characterized by diverse boiling points in relation to each other and by the indicated increase of boiling point relatively to their source materials.

If the end-point of the hydrocarbon fraction treated with hydrochloric acid as above specified shall for example, be 45° C., the unconverted olefines, for the most part those of secondary base structure, readily separate by simple fractional distillation from the hydrocarbon chlorides. The secondary base olefines may thus be obtained in optimum condition for subsequent treatment, for example, with sulfuric acid or otherwise for conversion into secondary alcohols or for treatment for conversion into their respective esters.

In the instance of processing an original raw material or fraction containing a wider range of hydrocarbons, boiling for example up to 100° C., the monochlorhydrocarbons derived from the tertiary base olefines of four, five and six carbon atoms in some cases exhibit boiling points not widely different from the boiling points of unconverted hydrocarbons of six and seven carbon atoms. The preferred procedure for the treatment of such mixtures is to separate the unconverted hydrocarbons boiling up to 45° C. by distillation from the higher boiling constituents of the halide reaction mixture; then to hydrolyze the residue; and then to extract the resulting alcohols from their admixture with hydrocarbons, as by causing their preferential solution in water. The unconverted hydrocarbon residues thus obtained, may be returned severally or collectively to the first hydrohalogenation stage of the process, if their content of tertiary olefines warrants retreatment; or they may be subjected separately to treatment for the conversion to compounds of secondary base olefines.

The unchanged hydrocarbon distillate and/or residues of the first hydrohalogenation treatment may now be treated with appropriate concentrations of sulfuric acid, or other reagents to effect conversion into secondary derivatives, from which the secondary alcohols may be obtained by subsequent hydrolysis.

Alternatively, the secondary base and less reactive hydrocarbons now deprived of their original admixture of tertiary base and more reactive hydrocarbons, may now be subjected to more intense hydrohalogenation to obtain the respective halides. For example, the treatment may proceed under pressure at a temperature of the order of 100° C. with concentrated hydrochloric acid as a reagent for a time of the order of one hour. The mixture of chlorides thus produced may be subjected to a process of selective hydrolysis in which only the tertiary chlorides of the less reactive tertiary base substances are acted upon. Mere agitation with water at or near normal temperature is sufficient to bring about the hydrolysis of most of these tertiary chlorides to alcohols, whereas the hydrolysis of the secondary chlorides requires other and more difficult procedure, such as agitation with silver or lead hydroxide. The tertiary alcohols so obtained may be extracted from the unchanged chlorides by solvent extraction, or in some cases separated by distillation.

Whatever the treatment of the residual secondary base and less reactive olefine substances resorted to, the hydrohalogenation of the relatively complex mixture containing the tertiary base substances is of great advantage in providing a secondary-base and less-reactive hydrocarbon product, stripped of the highly-reactive group of substances, the presence of which would prevent or make difficult any subsequent treatment for the useful conversion of the secondary base substances.

Concentrated hydrochloric acid is not an extracting agent for the hydrocarbon mixture treated, the hydrogen chloride addition compounds being preferentially soluble in the unaltered hydrocarbons, including the secondary base group from which they are recovered. But if more dilute hydrochloric acid than the recommended concentration be used, the dilute acid appears to act as a catalyst promoting a simultaneous selective reaction with a part of the tertiary base substances and the partial hydrolysis of this part to the corresponding tertiary alcohols which dissolve in the water of dilution, from which these alcohols may be recovered. It is preferable, as described above, to avoid having to recover the tertiary alcohols from the dilute acid, and to recover these alcohols by hydrolysis and distillations from the hydrocarbon solution of the corresponding halide.

I do not herein claim the specific process characterized by a preliminary treatment of the described kinds of hydrocarbon mixtures for hydrohalogenation of the tertiary-base and diolefine substances, separation of the halide compounds, and subsequent treatment of the residual secondary base substances with sulfuric acid for the preparation of secondary alcohols, which specific process is the subject of my application for Patent Serial No. 65,498 of even date herewith.

What I claim is:

1. Process for the segregation and several recovery from admixtures of hydrocarbons containing hydrocarbons having secondary and tertiary base structures respectively, comprising subjecting the mixture to hydrohalogenation in a cold water solution of a hydrohalogen, maintaining the water solution at substantially constant saturation and separating the resulting hydrohalogenated derivatives of the hydrocarbons of tertiary base structure from the unchanged hydrocarbons of secondary base structure by fractional distillation.

2. Process for the preparation of secondary alkyl mono chlorides of not exceeding 6 carbon atoms to the molecule from a mixture of hydrocarbons derived from the pyrolysis of mineral oil and containing olefines, said olefines consisting predominantly of secondary and tertiary olefines of not exceeding 6 carbon atoms to the molecule, which comprises subjecting said mixture to hydrochlorination with an aqueous solution of hydrogen chloride at a temperature not higher than 20° C., while maintaining such an acid concentration as will selectively convert substantially all the tertiary olefines present into hydrogen chloride addition products, separating the unchanged hydrocarbon constituents from the converted tertiary olefines, and subjecting the secondary olefines contained in said separated unchanged hydrocarbon constituents to hydrochlorination, under pressure and at a higher temperature, with hydrogen chloride, while maintaining such a concentration of hydrogen chloride as will form addition products of the said secondary olefines.

3. Process for the preparation of secondary hydrocarbon derivatives of not exceeding 6 carbon atoms to the molecule from a mixture of hydrocarbons derived from the pyrolysis of mineral oil and containing olefines, said olefines consisting predominantly of secondary and tertiary olefines of not exceeding 6 carbon atoms to the molecule, comprising as steps subjecting said mixture to hydrochlorination with hydrogen chloride, while maintaining such a concentration of hydrogen chloride and temperature as will selectively convert substantially all the tertiary olefines present into hydrogen chloride addition products, subjecting said addition products and unaltered hydrocarbons to fractional distillation, and separately collecting the hydrocarbons of lower boiling point than the said addition compounds.

4. Process for the preparation of secondary alkyl mono chlorides of not exceeding 6 carbon atoms to the molecule from a mixture of hydrocarbons derived from the pyrolysis of mineral oil and containing olefines, said olefines consisting predominantly of secondary and tertiary olefines of not exceeding 6 carbon atoms to the molecule, comprising as steps subjecting said mixture to hydrochlorination with hydrogen chloride, while maintaining such a concentration of hydrogen chloride and temperature as will selectively convert substantially all the tertiary olefines present into hydrogen chloride addition products, separating the unchanged hydrocarbons by distillation, and subjecting the secondary olefines contained in said separated unchanged hydrocarbons to the action of concentrated hydrogen chloride under pressure and at temperatures of about 100° C.

Signed by me at Cambridge, Massachusetts, this twenty-sixth day of October, 1925.

HAROLD S. DAVIS.